(12) United States Patent
Corcoran et al.

(10) Patent No.: US 7,276,288 B2
(45) Date of Patent: Oct. 2, 2007

(54) DURABLE COATING COMPOSITIONS CONTAINING ASPARTIC COMPOUNDS

(75) Inventors: Patrick Henry Corcoran, Cherry Hill, NJ (US); Joseph Norbert Weber, Newark, DE (US)

(73) Assignee: E. I. du Pont de Nemours & Co., Wilmington, DE (US)

( * ) Notice: Subject to any disclaimer, the term of this patent is extended or adjusted under 35 U.S.C. 154(b) by 0 days.

(21) Appl. No.: 10/737,338

(22) Filed: Dec. 16, 2003

(65) Prior Publication Data
US 2004/0147648 A1    Jul. 29, 2004

Related U.S. Application Data

(60) Provisional application No. 60/437,957, filed on Jan. 3, 2003.

(51) Int. Cl.
    B32B 27/40    (2006.01)
    C08G 18/32    (2006.01)
(52) U.S. Cl. .................. 428/423.1; 428/423.3; 528/68; 528/84
(58) Field of Classification Search .......... 428/423.1, 428/423.3; 528/68, 84, 60, 61
See application file for complete search history.

(56) References Cited

U.S. PATENT DOCUMENTS 4,591,533 A    5/1986    Antonelli et al.

(Continued)

FOREIGN PATENT DOCUMENTS

WO    WO03/057374 A2    7/2003

OTHER PUBLICATIONS

Wolf, R., "Plastics, Additives," Ullmann's Encyclopedia of Industrial Chemistry, Wiley-VCH GmbH & Co., online posting date Jun. 15, 2000.*

*Primary Examiner*—Thao Tran
(74) *Attorney, Agent, or Firm*—Sudhir G. Deshmukh

(57) ABSTRACT

A coating composition comprising a binder of
  a. polyisocyanate crosslinking agent;
  b. an isocyanate-reactive component having at least one compound having the following formula:

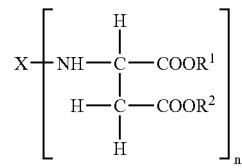

wherein X is an aliphatic or cycloaliphatic group, $R^1$ and $R^2$ are the same or different organic groups that are inert to isocyanate groups, and n is 2 to 4, and
  c. optionally, a polymeric component having a number average molecular weight of 5,000 to 50,000 having reactive groups that crosslink with an isocyanate, where the reactive groups are hydroxyl, carboxyl, glycidyl, amine and any mixtures thereof; and
  d. optionally, an oligomeric component having a number average molecular weight of 300 to 3,000 having reactive groups that crosslink with an isocyanate, where the reactive groups are hydroxyl, carboxyl, glycidyl, amine, aldimines, phosphoric acid, ketimine and any mixtures thereof; and
contains the following additives: disubstituted phenol antioxidant or a hydroperoxide decomposer, an ultraviolet light absorber, and a hindered amine light stabilizer.

19 Claims, 1 Drawing Sheet

U.S. PATENT DOCUMENTS

| | | |
|---|---|---|
| 5,126,170 A | 6/1992 | Zwiener et al. |
| 5,236,741 A | 8/1993 | Zwiener et al. |
| 5,243,012 A | 9/1993 | Wicks et al. |
| 5,412,056 A | 5/1995 | Zwiener et al. |
| 5,516,873 A | 5/1996 | Hicks et al. |
| 5,580,945 A | 12/1996 | Wade et al. |
| 5,591,807 A | 1/1997 | Cai et al. |
| 5,652,301 A * | 7/1997 | Schmitt et al. ............. 524/591 |
| 5,763,528 A | 6/1998 | Barsotti et al. |
| 6,005,062 A | 12/1999 | Hansen et al. |
| 6,013,755 A * | 1/2000 | Primeaux et al. ............. 528/68 |
| 6,399,736 B1 | 6/2002 | Primeaux, II et al. |
| 2002/0132934 A1* | 9/2002 | Huynh-Ba .................. 525/453 |

* cited by examiner

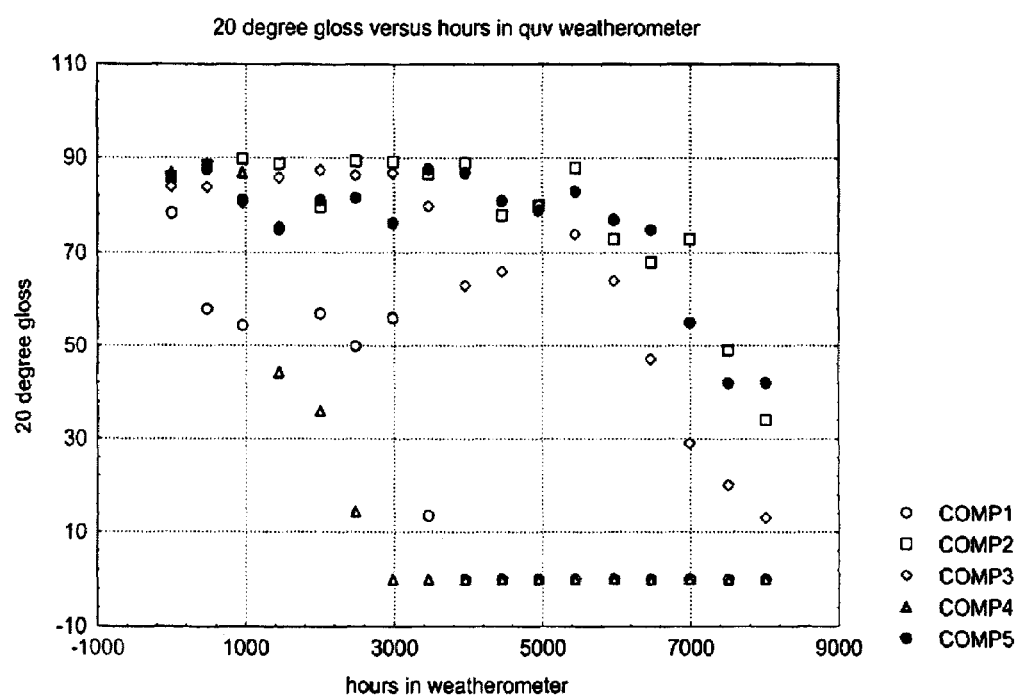

DURABLE COATING COMPOSITIONS CONTAINING ASPARTIC COMPOUNDS

CROSS-REFERENCE TO RELATED APPLICATION

This application claims priority under 35 U.S.C. §119 from U.S. Provisional Application Ser. No. 60/437,957 (filed Jan. 3, 2003), which is incorporated by reference herein as if fully set forth.

BACKGROUND OF THE INVENTION

1. Field of the Invention

This invention is directed to coating compositions, in particular, to durable and weatherable coating compositions useful as clear finishes for automobiles and trucks.

2. Description of the Prior Art

The finishing system of choice presently being used on the exterior of automobiles and trucks comprises a clear coating applied over pigmented base coating that is applied over a primer coating. The clear coating provides protection, in particular protection from weathering, to the pigmented base coating and improves the appearance of the overall finish, in particular, provides improved gloss and distinctness of image. When used in refinishing of automobile and truck bodies, the clear coating is required to have a reasonably short cure time period to allow for further processing or handling of the vehicle with out damaging the finish.

The following US Patents: U.S. Pat. No. 5,516,873, U.S. Pat. No. 5,126,170, U.S. Pat. No. 5,243,012, U.S. Pat. No. 5,236,741, U.S. Pat. No. 5,412,056, U.S. Pat. No. 5,580,945, and U.S. Pat. No. 6,005,062, show a variety of coating composition that contain polyaspartic acid derivatives but coating compositions formulated according to the teaching of these patents do not have the combination of properties of rapid cure and excellent weatherability that are currently desired for clear coating compositions and in particular, for such compositions that are used for the repair of the finishes of automotive and truck exterior finishes.

It would be desirable to form a clear coating composition that cures rapidly after application and provides a protective clear finish that has good gloss and distinctness of image that provides an excellent appearance, has excellent weatherability, in particular resistance to U.V. (ultraviolet light) degradation and also hardens in a reasonably short time after application.

SUMMARY OF THE INVENTION

A coating composition comprising a binder of
a. polyisocyanate crosslinking agent;
b. an isocyanate-reactive component having at least one compound having the following formula:

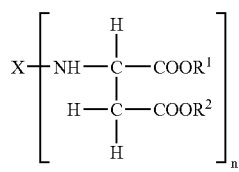

wherein X is an aliphatic or cycloaliphatic group, $R^1$ and $R^2$ are the same or different organic groups that are inert to isocyanate groups, and n is 2 to 4, c. optionally, a polymeric component having a number average molecular weight of 5,000 to 50,000 having reactive groups that crosslink with an isocyanate, where the reactive groups are hydroxyl, carboxyl, glycidyl, amine and any mixtures thereof; and
d. optionally an oligomeric component having a number average molecular weight of 300 to 3,000 having reactive groups that crosslink with an isocyanate, where the reactive groups are hydroxyl, carboxyl, glycidyl, amine, aldimines, phosphoric acid, ketimine and any mixtures thereof; and wherein the composition contains the following additives:
(1) a disubstituted phenol antioxidant or a hydroperoxide decomposer,
(2) an ultraviolet light absorber, and
(3) a hindered amine light stabilizer.

BRIEF DESCRIPTION OF DRAWING

FIG. 1 is a graph, which shows 20° Gloss versus hours in the QUV weathering device at various times of exposure.

DETAILED DESCRIPTION OF THE INVENTION

A typical auto or truck body is produced from a steel sheet or a plastic or a composite substrate. For example, the fenders may be of plastic or a composite and the main portion of the body of steel. If steel is used, it is first treated with an inorganic rustproofing compound, such as, zinc or iron phosphate and then a primer coating is applied generally by electrodeposition. Typically, these electrodeposition primers are epoxy-modified resins crosslinked with a polyisocyanate and are applied by a cathodic electrodeposition process. Optionally, a primer can be applied over the electrodeposited primer, usually by spraying, to provide better appearance of a base coating or a mono coating applied over the primer and improve the adhesion of such coatings to the primer or both of the above. A mono coating of a pigmented coating composition then can be applied but preferably, a pigmented base coating with a clear top coating is applied to form a clear coat/color coat finish on the truck or automobile body or auto or truck part. Usually, after application, each of the coatings is cured by baking at an elevated temperature. It is generally known that a clear top coating can be applied over the base coating and both coatings cured together at an elevated temperature. When refinishing automobile and truck bodies, the coatings are usually cured at ambient temperatures or at slightly elevated temperatures, such as, 40 to 100° C.

A "clear coating composition" for automotive use is a composition that forms a transparent finish upon curing and has a DOI (distinctness of image) of more than 70 and a 20° gloss of more than 70. These clear coatings provide a glossy in depth appearance to the finish on the automobile or truck and therefore, are required to have good gloss and distinctness of image. Also, the clear finish also provides resistance to weathering, in particular to U.V. degradation and photooxidation.

The term "binder" as used herein refers to the film forming constituents of the composition that include the isocyanate reactive component, an optional polymeric and/or oligomeric component, polyisocyanate crosslinking agent and optional reactive diluents. Solvents, pigments, catalysts, rheology modifiers, antioxidants, U.V. absorbers, hindered amine light stabilizers, hydroperoxide decomposers leveling agents, antifoaming agents, anti-cratering agents, adhesion promoting agents are not included in the term.

Molecular weight (both number and weight average) is determined by gel permeation chromatography utilizing a high performance liquid chromatograph supplied by Hewlett-Packard, Palo Alto, Calif. and unless otherwise stated the liquid phase used was tetrahydrofuran and the standard was polymethylmethacrylate or polystyrene.

"Tg" (glass transition temperature) is in ° C. and determined by Differential Scanning Calorimetry or calculated according to the Fox Equation.

Typically the binder of the novel composition comprises 20 to 80% by weight, based on the weight of the binder, of the isocyanate reactive component or aspartic acid derivative and 20 to 80% by weight, based on the weight of the binder, of a polyisocyanate crosslinking agent. Optionally, the binder can contain 1 to 50% by weight, preferably, 5 to 30% by weight, based on the weight of the binder, of a polymeric or oligomeric component or both wherein the component contains groups that are reactive with the polyisocyanate crosslinking agent. One preferred binder composition contains 25 to 50%, by weight of the aspartic acid derivative, 5 to 30% by weight of the polymeric or oligomeric component or both and 20 to 70% by weight of a polyisocyanate, wherein the sum of all of the components of the binder is 100%.

Particular advantages of the novel coating composition of this invention is that is provides a protective clear finish that has good gloss and distinctness of image that provides an excellent appearance, has excellent weatherability, in particular resistance to U.V. degradation and photo-oxidation and also hardens in a reasonably short time after application. For example, when used to refinish automobiles and trucks, the composition after application cures to a tack free state in a relatively short period of time under ambient temperatures or under slightly elevated drying temperatures, for example, 40 to 100° C., that allows a coated vehicle to be moved or further processed without damage to the finish.

The novel composition typically is solvent based and has a solids content of film forming binder of 20 to 90% by weight, preferably, 60 to 75% by weight. It may be possible to formulate a 100% solids composition with the use of reactive diluents. An aqueous liquid carrier, which typically is water but may contain other liquids, may be used in place of the solvent. Before application a sufficient amount of liquid usually is added, for example, water or solvents, to reduce the composition to a spray viscosity.

In the event the novel coating composition is an aqueous based composition, the composition typically has a pH of 6.0 to 10.0 and preferably, 7.5 to 8.5. The pH may be adjusted by the addition of various amines.

The isocyanate reactive component of the novel composition is an aspartic acid derivative and is described in Zwiener et al. U.S. Pat. No. 5,236,741, issued Aug. 17, 1993, which is hereby incorporated by reference. These components have the formula

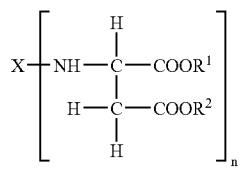

wherein X is an aliphatic or cycloaliphatic group, $R^1$ and $R^2$ are the same or different organic groups that are inert to isocyanate groups, and n is 2 to 4. Preferably, X is a cycloaliphatic group $R^1$ and $R^2$ are aliphatic groups and more preferably, are alkyl groups having 2 to 8 carbon atoms. One particularly preferred component is the reaction product of methylene bis(cyclohexyl amine) and a dialkyl maleate, preferably, diethyl maleate, in a 1:2 molar ratio.

The optional polymeric component has groups that are reactive with isocyanate and can be used in an amount of 1 to 50% by weight, based on the weight of the binder. One preferred polymeric component is an acrylic polymer. Typically useful acrylic polymers have a number average molecular weight of about 5,000 to 50,000, a Tg of 10 to 80° C. and contain moieties, such as, hydroxyl, carboxyl, glycidyl and amino groups. Typically useful acrylic polymers are those known in the art and are polymers of two or more of the following: linear alkyl(meth)acrylates having 1 to 12 carbon atoms in the alkyl group, cyclic or branched alkyl (meth)acrylates having 3 to 12 carbon atoms in the alkyl group including isobornyl(meth)acrylate, hydroxy alkyl (meth)acrylates having 1 to 4 carbon atoms in the alkyl group, glycidyl(meth)acrylate, hydroxy amino alkyl(meth) acrylates having 1 to 4 carbon atoms in the alkyl group, and can contain styrene, alpha methyl styrene, vinyl toluene, (meth)acrylonitrile (meth)acryl amides, (meth)acrylic acid, (meaning both acrylic acid and methacrylic acid)trimethoxysilylpropyl(meth)acrylate and the like.

Preferred are hydroxy functional acrylic polymers having a hydroxy equivalent weight of 300 to 1300 and are polymers of hydroxy alkyl (meth)acrylates and one or more of the aforementioned monomers. One preferred hydroxy containing acrylic polymer contains 35 to 50% by weight styrene, 15 to 25% by weight ethylhexyl methacrylate and 15 to 20% by weight isobornyl methacrylate and 20 to 30% by weight hydroxyethyl methacrylate. A particularly preferred acrylic polymer contains 37% styrene, 20% by weight 2-ethylhexyl methacrylate and 17.5% by weight of isobornyl methacrylate and 25.5% by weight hydroxyethyl methacrylate.

Acrylic oligomers having a number average molecular weight of 300 to 3,000 of the aforementioned monomeric components also can be used as the optional polymeric component. By using monomers and reactants well known to those skilled in the art, these oligomers can have the one or more of the following groups that are reactive with isocyanate: hydroxyl, carboxyl, glycidyl, amine, aldimine, phosphoric acid and ketimine.

Polyesters can also be used as the optional polymeric component, such as, hydroxyl or carboxyl terminated or hydroxyl or carboxyl containing polyesters. The following are typically useful polyesters or ester oligomers: polyesters or oligomers of caprolactone diol and cyclohexane dimethylol, polyesters or oligomers of tris-hydroxy ethylisocyanurate and caprolactone, polyesters or oligomers of trimethylol propane, phthalic acid or anhydride and ethylene oxide, polyesters or oligomers of pentaerythritol, hexahydrophthalic anhydride and ethylene oxide, polyesters or oligomers of pentaerythritol, hexahydrophthalic anhydride and butylene oxide.

The aforementioned polyesters and oligomers can be reacted with an organic isocyanate to form urethane polymers and oligomers that can be used as the optional polymeric component in the novel composition.

One useful urethane oligomer that can used in the novel composition is formed by reacting an aliphatic polyisocyanate with an aliphatic or cycloaliphatic monohydric alcohol and subsequently reacting the resulting composition with a hydroxy functional aliphatic carboxylic acid until all of the isocyanate groups have been reacted. One useful polyurethane oligomer comprises the reaction product of the isocyanurate of hexane diisocyanate, cyclohexanol and dimethylol propionic acid. To form a water dispersible oligomer, an amine is can be added.

Typically useful organic polyisocyanates crosslinking agents that can be used in the novel composition of this invention include aliphatic polyisocyanates, cycloaliphatic polyisocyanates and isocyanate adducts.

Examples of suitable aliphatic and cycloaliphatic polyisocyanates that can be used include the following: 4,4'dicyclohexyl methane diisocyanate, ("H$_{12}$MDI"), trans-cyclohexane-1,4-diisocyanate, 1,6-hexamethylene diisocyanate ("HDI"), isophorone diisocyanate,("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2 cyclohexane diisocyanate, 1,4 cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets of hexamethylene diisocyanate, allophanates, trimers and biurets of isophorone diisocyanate and the isocyanurate of hexane diisocyanate.

Tri-functional isocyanates also can be used, such as, Desmodur® N 3300, trimer of hexamethylene diisocyanate, Desmodur® 3400, trimer of isophorone diisocyanate, Desmodur® 4470 trimer of isophorone diisocyanate, these trimers are sold by Bayer Corporation. A trimer of hexamethylene diisocyanate sold as Tolonate® HDT from Rhodia Corporation is also suitable.

An isocyanate functional adduct can be used, such as, an adduct of an aliphatic polyisocyanate and a polyol. Also, any of the aforementioned polyisocyanates can be used with a polyol to form an adduct. Polyols, such as, trimethylol alkanes, particularly, trimethylol propane or ethane can be used to form an adduct.

The novel composition can contain 0.1 to 5% by weight, based on the weight of the binder of acrylic NAD (non-aqueous dispersed) resins. These NAD resins typically are high molecular weight resins having a crosslinked acrylic core with a Tg between 20 to 100° C. and attached to the core are low Tg stabilizer segments. A description of such NADs is found in Antonelli et al. U.S. Pat. No. 4,591,533 and in Barsotti et al. U.S. Pat. No. 5,763,528 which patents are hereby incorporated by reference.

Typically, a catalyst is used in the novel composition to reduce curing time and temperature and allow curing of the coating at ambient temperatures. Useful catalysts include those known to the person skilled in the art, like, alkyl carboxylic acids having 1 to 12 carbon atoms in the alkyl group, such as, acetic acid, formic acid, glycolic acid; aromatic acids, such as, benzoic acid; and oligomers having pendant acid groups.

The novel composition contains about 0.1 to 5% by weight, based on the weight of the binder, of ultraviolet light absorbers. Typically useful ultraviolet light absorbers include hydroxyphenyl benzotriazols, such as, 2-(2-hydroxy-5-methylphenyl)-2H-benzotrazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

The novel composition contains about 0.1 to 5% by weight, based on the weight of the binder, of a di- substituted phenol antioxidant or a hydroperoxide decomposer. Typically useful antioxidants include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6(1H,3H,5H)-trione and benzenepropanoic acid, 3,5-bis(1,1-dimethyl-ethyl)-4-hydroxy-$C_7$-$C_9$ branched alkyl esters. Typically useful hydroperoxide decomposers include Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

The novel composition contains about 0.1-5% by weight, based on the weight of the binder, of hindered amine light stabilizers. Typically useful hindered amine light stabilizers include N-(1,2,2,6,6-pentamethyl-4-piperidinyl)-2-dodecyl succinimide, N(1acetyl-2,2,6,6-tetramethyl-4-piperidinyl)-2-dodecyl succinimide, N-(2-hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N,N'''-dibutyl-N',N'''-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl) methyl]butyl propanedioate, 8-acetyl-3-dodecyl-7,7,9,9,-tetramethyl-1,3,8-triazaspiro(4,5)decane-2,4-dion, dodecyl/tetradecyl-3-(2,2,4,4-tetramethyl-2I-oxo-7-oxa-3,20-diazal dispiro(5.1.11.2)henicosan-20-yl)propionate.

Typically, the composition is a solvent based composition and any of the known organic solvents may be used to form the coating composition. Typical solvents include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate; and mixtures of any of the above.

The novel coating composition may also include other conventional formulation additives, such as, wetting agents, leveling and flow control agents, for example, Resiflow®S (polybutylacrylate), BYK® 320 and 325 (high molecular weight polyacrylates), BYK® 347 (polyether-modified siloxane), rheology control agents, such as, fumed silica, defoamers, surfactants and emulsifiers to help stabilize the composition. Other additives that tend to improve mar resistance can be added, such as, silsesquioxanes and other silicate-based micro-particles.

The coating composition of this invention can be used as a clear coat that is applied over a pigmented base coat that may a pigmented version of the composition of this invention or another type of a pigmented base coat. The clear coating can be in solution or in dispersion form.

Typically, a clear coating is then applied over the base coating before the base coating is fully cured, a so called "wet-on-wet process", and the base coating and clear coating are then fully cured at ambient temperatures or can be cured by heating to elevated temperatures of 50° C. to 100° C. for 15 to 45 minutes. The base coating and clear coating preferably have a dry coating thickness ranging from 25 to 75 microns and 25 to 100 microns, respectively.

The novel coating composition may be used as a base coat or as a pigmented monocoat topcoat. Both of these compositions require the presence of pigments. Typically, a pigment-to-binder ratio of 0.1/100 to 200/100 is used depending on the color and type of pigment used. The pigments are formulated into mill bases by conventional procedures, such as, grinding, sand milling, and high speed mixing. Generally, the mill base comprises pigment and a dispersant in an aqueous medium. The mill base is added in an appropriate amount to the coating composition with mixing to form a pigmented coating composition.

Any of the conventionally-used organic and inorganic pigments, such as, white pigments, like, titanium dioxide, color pigments, metallic flakes, such as, aluminum flake, special effects pigments, such as, coated mica flakes, coated aluminum flakes and the like and extender pigments can be used. It may be desirable to add flow control additives.

The novel coating composition may be used as a primer in which case typical pigments used in primers would be added, such as, carbon black, barytes, silica, iron oxide and other pigments that are commonly used in primers in a pigment-to-binder ratio of 150/100 to 300/100.

The coating composition can be applied by conventional techniques, such as, spraying, electrostatic spraying, dipping, brushing, and flow coating.

The coating composition is particularly useful for the repair and refinish of automobile bodies and truck bodies and parts as a clear coat, pigmented base coat, or as a primer. The novel composition has uses for coating any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, large commercial aircraft and small pleasure aircraft, pleasure vehicles, such as, snow mobiles, all terrain vehicles, personal watercraft, motorcycles, and boats. The novel composition also can be used as a coating for industrial and commercial new construction and maintenance thereof; cement and wood floors; walls of commercial and residential structures, such as, office buildings and homes; amusement park equipment; concrete surfaces, such as, parking lots and drive ways; asphalt and concrete road surface, wood substrates, marine surfaces; outdoor structures, such as bridges, towers; coil coating; railroad cars; printed circuit boards; machinery; OEM tools; signs; fiberglass structures; sporting goods; and sporting equipment.

The following are testing procedures used in the Examples:

20° Gloss—measure using a Byk Gardner Micro-tri-gloss portable measuring unit. A rating of at least 70 is an acceptable minimum.

DOI—distinctness of image—test method ASTM D5767—a Dorigon II unit was used. A rating of at least 70 is an acceptable minimum.

Persoz Hardness Test—the change in film hardness of the coating was measured with respect to time after application by using a Persoz Hardness Tester Model No. 5854 [ASTM D4366] supplied by Byk-Mallinckrodt, Wallingford, Conn. The number of Oscillations [referred as Persoz No.] are recorded.

QUV Exposure Test

Powerchron panels model APR18796 obtained from ACT, Hilldale, Mich. were coated with 1 mil (25.4 micron) thick DuPont Chromabase refinish white base coat coded B8469. The panels were allowed to age under ambient temperature conditions for one week and then the test clear coating composition was applied with a 0.010 inch clearance bird applicator to form a coating having a dry film thickness of 40 to 75 microns. The panel were then placed in a QUV Weathering Tester Model QUV/se from Q-Panel Lab Products. The panels were exposed to the following two test cycles over every 24 hour period:

Cycle 1—8 hours at 70° C. with irradiance of 0.68 W/m$^2$/nm at 340 nm with no condensation.

Cycle 2—4 hours at 50° C. with no irradiance.

At various set intervals the panels were evaluated for gloss, distinctness of image and color.

Swelling Ratio at 3 days

The swelling ratio of the film was determined after 3 days from the initial drawn down of a coating on a panel of TPO (thermoplastic polyolefin).

After the coating was dry, a free film was lifted off of the TPO using a single edge razor. A circular sample was punched form the film with a 3.1 mm grid punch. The film was positioned between two sheets of aluminum foil and a circular sample 3.1 mm in diameter was punched out and the foil removed and the sample was mounted on a slide. The diameter of the sample was measured with a microscope equipped with a filar micrometer. The original diameter is $D_o$. Methylene chloride was dropped onto the sample and a glass panel was placed over the sample. When the swelling reached equilibrium the swollen diameter of the sample was measured $D_s$. The swelling ratio was then determined. Swell Ratio=$(D_s/2)^2/(D_o/2)^2$. The swell ratio is a measure of the cure and the following ratings were used:

| Cure | Swelling Ratio (3 days) |
|---|---|
| Excellent | less than 1.55 |
| Very Good | 1.55-1.65 |
| Good | 1.66-1.75 |
| Fair | 1.76-1.85 |
| Poor | 1.86-2.00 |
| Very Poor | Greater than 2.00 |

Dry to Assemble Test

A steel panel is coated with the coating composition using the above bird applicator to form a film 40 to 75 microns thick. The time of application is noted as $T_1$. Every 10 minutes after application the panel is placed on a top loading balance and pushed down with the force of 2 kgm and the thumb is twisted. 15 minutes are allowed for any deformation to disappear. The time the deformation does not appear is recorded as $T_2$. The dry to assembly time=$T_2-T_1$.

The following examples illustrate the invention. All parts and percentages are on a weight basis unless otherwise indicated. Molecular weights are determined by GPC (Gel Permeation Chromatography) using polymethyl methacrylate as the standard.

EXAMPLE

Preparation of the Clearcoat Composition

The following components were used to prepare Clear Coating Compositions 1-5:

Desmodur® 1420—reaction product of methylene bis (cyclohexyl amine) and diethyl maleate in a 2:1 molar ratio sold by Bayer Corporation, Pittsburgh, Pa.

Acetic Acid Solution—10% by weight acetic acid in butyl acetate.

Tinuvin® 384 Solution—25% solution in butyl acetate of a substituted benzotriazole derivative from Ciba Specialty Chemicals, Basel, Switzerland.

Tinuvin® 292 Solution—25% solution in butyl acetate of bis(1,2,2,6,6-pentamethyl-4-piperidinyl sebacate) available from Ciba Specialty Chemicals, Basel, Switzerland.

Siloxane Solution—1% solution in butyl acetate of a polyether modified dimethylpolysiloxane called Byk-333 from Byk-Chemie.

Irganox® 1010 Solution—10% solution in butyl acetate of benzenepropanoic acid, 3,5-bis(1,1-dimethyl-ethyl)-4-hydroxy-$C_7$-$C_9$ branched alkyl esters.

Irganox® 1135 Solution—10% solution in butyl acetate of a liquid hindered phenolic antioxidant from Ciba Specialty Chemicals.

Sanko® HCA Solution—10% solution in butyl acetate of 9,10-dihydro-9-oxa-10-phosphenanthrene-10-oxide from Sanko Chemical Corporation.

Desmodur® 3300—trimer of hexamethylene diisocyanate from Bayer Corporation.

Clear Coating Compositions 1-5 were each prepared by charging the components shown in Table 1 into a mixing vessel and mixing the components of Part 1 together and Part 2 together. Just before application of the coating composition to a substrate, Parts 1 and 2 were mixed together:

TABLE 1

| Components | Comp. 1 | Comp. 2 | Comp. 3 | Comp. 4 | Comp. 5 |
|---|---|---|---|---|---|
| Part 1 | | | | | |
| Desmodur® 1420 Solution | 32.82 | 32.67 | 32.67 | 33.84 | 32.51 |
| Acetic Acid Soln. | 1.45 | 1.44 | 1.44 | 1.49 | 1.43 |
| Tinuvin® 384 Solution | 3.48 | 3.46 | 3.46 | 0 | 3.44 |
| Tinuvin® 292 Solution | 3.48 | 3.46 | 3.46 | 0 | 3.44 |
| Siloxane 11277 Solution | 5.80 | 5.77 | 5.77 | 5.77 | 5.74 |
| Irganox® 1010 Solution | 0 | 0 | 0 | 0 | 2.87 |
| Irganox® 1135 Solution | 0 | 2.88 | 0 | 0 | 0 |
| Sanko® HAC Solution | 0 | 0 | 2.88 | 0 | 2.87 |
| Butyl Acetate | 27.72 | 25.18 | 25.18 | 38.65 | 22.66 |
| Part 2 | | | | | |
| Desmodur® 3300 | 25.22 | 25.10 | 25.10 | 26.00 | 24.98 |
| NCO/OH ratio | 1.1/1 | 1.1/1 | 1.1/1 | 1.1/1 | 1.1/1 |

The above prepared clear coating composition 1-5 were each applied by spraying as a clear coat onto a phosphatized steel panel coated with a cured cathodic epoxy resin based electrodeposition primer over which a black pigmented waterborne base coating composition of an acrylic polymer crosslinked with a melamine resin was applied to a wet film thickness of 12.7-20.32 microns (0.5-0.8 mils), flash dried for 5 minutes and baked for 10 minutes at 82° C. (180° F.). The above prepared clear coating was applied to a wet film thickness of 58-63 microns (2.3-2.5 mils) and cured at ambient temperatures.

The following tests were conducted on each of the panels: Dry to Assembly Test, Persoz hardness after 1 hour and Swelling ratio at 3 days. The results are shown in Table 2.

TABLE 2

| Composition | 1 | 2 | 3 | 4 | 5 |
|---|---|---|---|---|---|
| Dry to Assemble time in minutes | 36 | 34 | 33 | 30 | 30 |
| Persoz Hardness after one hour | 36 | 35 | 27 | 31 | 26 |
| Swelling Ratio at 3 days | 1.78 | 1.75 | 1.73 | 1.74 | 1.61 |
| 20° Gloss after 7000 hrs of exposure in QUV | 0 | 73 | 29 | 0 | 55 |
| DOI after 7000 hrs of exposure in QUV | 0 | 84 | 11 | 0 | 56 |

The test results for Dry to Assemble time, Persoz Hardness and Swelling Ratio after 3 days were acceptable for Compositions 1-5 which shows that the additives added to Compositions 2, 3 and 5 did not adversely affect these important properties.

Another set of panels was prepared as above and exposed to QUV accelerated weathering device and the 20° Gloss and DOI results for 7000 hours exposure in the QUV accelerated weathering device are shown in Table 2 above. Compositions 1 and 4 that did not contain disubstituted phenolic antioxidants or phosphite type hydroperoxide decomposers stabilizers failed completely.

The circles on the graph of FIG. 1 represent Composition 1, the squares Composition 2, the diamonds, Composition 3, the triangles, Composition 4 and the solid circles Composition 5. Compositions 2, 3 and 5 represent the invention where either a disubstituted phenolic antioxidant or phosphite type hydroperoxide decomposer was included.

In summary, the graph of FIG. 1 shows unacceptable QUV weathering for Composition 1 that did not contain a disubstituted phenol antioxidant and Composition 4 that did not contain a disubstituted phenol antioxidant, or a UV absorber or a hindered amine light stabilizer. Compositions 2, 3 and 5 that represent the invention that contained the antioxidant, UV light absorber and hindered amine light stabilizer in combination with the aspartic acid derivative had significantly improved weathering properties in comparison to Compositions 1 and 4.

The invention claimed is:

1. A coating composition comprising a binder consisting essentially of:
    a. polyisocyanate crosslinking agent;
    b. 1 to 50% by weight, based on the weight of the binder, of a urethane oligomer consisting essentially of the reaction product of the isocyanurate of hexane diisocyanate with cyclohexanol and dimethylol propionic acid; and
    c. optionally, a polymeric component having a number average molecular weight of 5,000 to 50,000 and having reactive groups that crosslink with an isocyanate, where the reactive groups are selected from the group consisting of hydroxyl, carboxyl, glycidyl, amine and any mixtures thereof; and
    d. optionally, an oligomeric component having a number average molecular weight of 300 to 3,000 having reactive groups that crosslink with an isocyanate, where the reactive groups are hydroxyl, carboxyl, glycidyl, amine, aldimines, phosphoric acid, ketimine and any mixtures thereof; and
    e. additives consisting of:
        (1) a hydroperoxide decomposer,
        (2) an ultraviolet light absorber, and
        (3) a hindered amine light stabilizer.

2. The coating composition of claim 1 wherein the binder contains 1 to 50% by weight, based on the weight of the binder, of an acrylic polymer having a number average molecular weight of 5,000 to 50,000 and having groups reactive with isocyanate.

3. The coating composition of claim 2 wherein the acrylic polymer consists essentially of polymerized monomers selected from the group consisting of linear alkyl (meth)acrylates having 1 to 12 carbon atoms in the alkyl group, alkyl (meth)aorylares having 1 to 12 carbon atoms in the alkyl group, cyclic or branched alkyl (meth)acrylates having 3 to 12 carbon atoms in the alkyl group, isobornyl (meth)acrylate, styrene, alpha methyl styrene, (meth)acrylonitrile, (meth)acryl amides, and polymerized monomers that provide groups reactive with isocyanate selected from the group consisting of hydroxy alkyl (meth)acrylates, glycidyl (meth)acrylates, amino alkyl(meth)acrylates and (meth)acrylic acid.

4. The coating composition of claim 3 wherein the acrylic polymer has a hydroxyl equivalent weight of 300 to 1300 and consists essentially of polymerized monomers selected from the group consisting of alkyl (meth)acrylates having 1 to 12 carbon atoms in the alkyl group, cyclic or branched alkyl (meth)acrylates having 3 to 12 carbon atoms in the alkyl group, isobornyl methacrylate, styrene, alpha methyl styrene, (meth)acrylonitrile, (meth)acryl amides, and polymerized monomers consisting of hydroxy alkyl (meth)acrylates having 1 to 4 carbon atoms in the alkyl group.

5. The coating composition of claim 4 wherein the acrylic polymer consists essentially of styrene, ethylhexyl methacrylate, isobornyl methacrylate and hydroxyethyl methacrylate.

6. The coating composition of claim 1 wherein the binder contains 1 to 50% by weight, based on the weight of the binder, of an acrylic oligomer having a number average molecular weight of 300 to 3,000 and having groups reactive with isocyanate selected from the group consisting of hydroxyl, carboxyl, glycidyl, amine, aldimines, phosphoric acid, ketimine and any mixtures thereof.

7. The coating composition of claim 6 wherein the oligomer consists essentially of polymerized monomers selected from the group consisting of linear alkyl (meth)acrylates having 1 to 12 carbon atoms in the alkyl group, alkyl (meth)acrylates having 1 to 12 carbon atoms in the alkyl group, cyclic or branched alkyl (meth)acrylates having 3 to 12 carbon atoms in the alkyl group, isobornyl (meth)acrylate, styrene, alpha methyl styrene, (meth)acrylonitrile, (meth)acryl amides, and polymerized monomers that provide groups reactive with isocyanate selected from the group consisting of hydroxy alkyl (meth)acrylates, glycidyl (meth)acrylates, amino alkyl(meth)acrylates and (meth)acrylic acid.

8. The coating composition of claim 1 wherein the polyisocyanate is selected from the group consisting of aliphatic polyisocyanates, cycloaliphatic polyisocyanates, aromatic polyisocyanates and isocyanate adducts.

9. The coating composition of claim 1 in which the polyisocyanate is selected from the group consisting of isophorone diisocyanate, hexamethylene diisocyanate, and trimer of hexamethylene diisocyanate.

10. The coating composition of claim 1 wherein the binder contains 1 to 50% by weight, based on the weight of the binder, of a polyester having hydroxyl groups.

11. The coating composition of claim 1 which contains about 0.1% to 5% by weight, based on the weight of the binder, of an ultraviolet light absorber.

12. The coating composition of claim 1 which contains about 0.1% to 5% by weight, based on the weight of the binder, of a hydroperoxide decomposer.

13. The coating composition of claim 1 which contains about 0.1% to 5% by weight, based on the weight of the binder, of a hindered amine light stabilizer.

14. A substrate coated with the composition of claim 1.

15. A substrate having a base coating of a pigmented coating of the composition of claim 1, which is top coated with a clear coating of the composition of claim 1.

16. A substrate having a multi-layer coating comprising a pigmented primer coating of the composition of claim 1, a base coating of a pigmented coating of the composition of claim 1, and a top-coating of a clear coating of the composition of claim 1.

17. A process for coating an auto body or auto part which comprises
    applying a base coating of a pigmented coating of the composition of claim 1 to a substrate;
    applying a top-coating of a clear coating of the composition of claim 1 over the base coating and
    curing the base coating and top-coating to form a base coat/clear coat finish on the substrate.

18. An auto body or auto part coated with the composition of claim 1.

19. The coating composition of claim 1 wherein the urethane oligomer also includes an amine.

* * * * *